United States Patent [19]
Musil et al.

[11] Patent Number: 5,350,252
[45] Date of Patent: * Sep. 27, 1994

[54] SINGLE DRUM MULTIPLE SOIL REMEDIATION AND CLASSIFICATION APPARATUS AND METHOD

[75] Inventors: Joseph E. Musil, Ely; William D. McFarland, Cedar Rapids, both of Iowa

[73] Assignee: Cedarapids, Inc., Cedar Rapids, Iowa

[*] Notice: The portion of the term of this patent subsequent to Mar. 16, 2010 has been disclaimed.

[21] Appl. No.: 990,504

[22] Filed: Dec. 15, 1992

Related U.S. Application Data

[63] Continuation-in-part of Ser. No. 908,903, Jul. 2, 1992, Pat. No. 5,193,935, which is a continuation of Ser. No. 638,046, Jan. 7, 1991, abandoned.

[51] Int. Cl.⁵ .................................................. B09B 3/00
[52] U.S. Cl. ...................................... 405/128; 405/101; 405/258
[58] Field of Search ............... 405/128, 129, 131, 258, 405/263; 110/346; 134/40; 210/170, 747; 432/105

[56] References Cited

U.S. PATENT DOCUMENTS

| | | |
|---|---|---|
| Re. 29,496 | 12/1977 | Dydzyk . |
| 1,205,948 | 11/1916 | Popkess . |
| 2,626,875 | 1/1953 | McConnaughay . |
| 3,820,914 | 6/1974 | Zimmerman . |
| 4,011,023 | 3/1977 | Cutler . |
| 4,226,552 | 10/1980 | Moench . |
| 4,272,212 | 6/1981 | Bauer, Jr. et al. . |
| 4,395,129 | 7/1983 | Musil . |
| 4,529,497 | 7/1985 | Watson et al. . |
| 4,619,550 | 10/1986 | Jeppson . |
| 4,705,404 | 11/1987 | Bruggemann . |
| 4,787,938 | 11/1988 | Hawkins . |
| 4,813,784 | 3/1989 | Musil . |
| 4,834,194 | 5/1989 | Manchak, Jr. . |
| 4,839,061 | 6/1989 | Manchak, Jr. et al. . |
| 4,919,570 | 4/1990 | Payne . |
| 4,993,873 | 2/1991 | Tippmer . |
| 5,039,415 | 8/1991 | Smith . |
| 5,067,254 | 11/1991 | Linkletter et al. . |
| 5,088,856 | 2/1992 | Yocum . |
| 5,193,935 | 3/1993 | Musil ................................ 405/128 |

OTHER PUBLICATIONS

"Counter Flow Design Stirs Interest" by Gary Gulick (May/Jun. 1988 Asphalt Contractor).

"Mixing to the heat of a different drum" by Marcy Goodfleisch (Texas State Department of Highways and Public Transportation, Jan. 1988).

*Primary Examiner*—David H. Corbin
*Attorney, Agent, or Firm*—Simmons, Perrine, Albright & Ellwood

[57] ABSTRACT

A single drum of a flow-through soil remediation plant includes a first zone which is a heating zone. The heating zone is disposed next to an intake end through which a first soil material to be contaminated is introduced into the remediation plant. Heat energy is supplied by a burner unit to the first zone to heat the first soil material to a first decontamination temperature. The first soil material then passes from the heating zone to a second zone which is a mixing zone. A second soil material may be introduced selectively into the mixing zone and mixed with the first soil material. With the first soil material having been heated to the first decontamination temperature in the first zone, heat energy is transferred from the first soil material to the second soil material during the mixing process. The heat transfer raises the heat of the second soil material to a second decontamination temperature. The mixed materials then advance to a third zone which has a classifies the mixed materials into first and second products according to size by separating less coarse materials from the more coarse materials. The classified materials are then discharged as first and second distinct products.

14 Claims, 2 Drawing Sheets

SINGLE DRUM MULTIPLE SOIL REMEDIATION AND CLASSIFICATION APPARATUS AND METHOD

CROSS REFERENCE TO RELATED APPLICATIONS

This application is a continuation-in-part application of co-pending U.S. patent application Ser. No. 07/908,903, filed Jul. 2, 1992, now U.S. Pat. No. 5,193,935 by Joseph E. Musil which is a continuation of patent application Ser. No. 07/638,046, filed Jan. 7, 1991, now abandoned.

BACKGROUND OF THE INVENTION

1. Field of the Invention

This invention relates generally to drum type continuous flow aggregate processing apparatus and methods. The invention is advantageously applicable to continuous flow soil remediation apparatus and methods, and is also advantageously applicable to such apparatus and methods using dual temperature zones.

2. Discussion of Related Art

Continuous processing of aggregate materials in drum driers and mixers has long been used in the production of road surfacing materials, such as hot asphalt aggregate mixes. Using similar drums for continuous processing of chemically contaminated soil to restore the soil to an environmentally acceptable condition has recently come into use.

Plant installations for remediating soil in continuous flow processes provide the means for cleaning up soil contaminations resulting from leaking underground storage tanks of gas stations, for example. Recent advances in the soil remediation technology have shown that flow-through or continuous process apparatus for dry heat soil decontamination and remediation operations is a feasible alternative to known batch type operations and particularly to wet processing batch type cleanup operations. In the course of being decontaminated or remediated, the soil materials to be cleaned of hydrocarbon type chemicals are heated to the volatization temperature of the contaminating hydrocarbons. One of the energy concerns in such a process is that hydrocarbon contaminants become vaporized over a rather broad range of temperatures. Therefore, to rid the soil of all hydrocarbons necessitates that it be heated to the highest temperature at which all hydrocarbons have become vaporized.

Mixes of hydrocarbons of differing chain-lengths cause the temperature requirements to vary. Vaporization temperatures vary depending on whether spills of heating oils or gasoline spills are to be removed from the soil. A soil remediation plant may need to accommodate hydrocarbon contaminated soils which become decontaminated only when heated to at least one thousand degrees Fahrenheit. Other contaminated soils may readily be cleaned of contaminating chemicals at temperatures no higher than five hundred degrees Fahrenheit, for example. Though it is possible to subject all soil with hydrocarbon contamination consistently to an uppermost required temperature at which even the most resisting contaminants become volatilized, the energy required to heat the bulk of the materials consistently to temperatures higher than necessary is wasteful and may itself contribute to unnecessary air pollution. It is furthermore undesirable to have a remediated soil product which is discharged at temperatures much higher than necessary to remove contaminants, and which then requires substantial time to cool before it is handled in further operations.

Energy requirements for effecting soil remediation also are found to vary with the coarseness of the material that is being decontaminated. Stone, or coarse aggregate, which is considered to be a high-capacity heat storage material and which is also a relatively poor heat conductor, requires a substantial energy input to become heated to a temperature at which hydrocarbon retained in its crevices will vaporize out. Energy requirements are further complicated because in many instances "fill dirt" containing substantial amounts of coarse materials may have been used to install some underground storage tanks. When the soil is returned to excavation sites after remediation, it is desirable to selectively replace the remediated soil to provide surface soil with a minimum of or with no coarse aggregate content while subsoil may contain a much greater or a substantial amount of such coarse aggregate.

Another problem or consideration concerning flow-through decontamination apparatus or processes for soils pertains to the cleanup of hot gases which perform the soil remediation process and which are subsequently released to the atmosphere. Vaporized hydrocarbons tend to cause blue smoke if simply vented to the atmosphere without further processing. According to currently known practices, vaporized hydrocarbons are routed toward the flame and are burned therein to reduce air pollution to acceptable standards, and to contribute at the same time toward the energy required for generating the hot gases which heat the soil material.

Because of the various factors that can affect the success of a commercial soil remediation operation, further improvements in processes and apparatus are desirable. Improvements are needed which address the above discussed problems and, at the same time, take into consideration the need to maintain compactness and cost efficiency in a soil remediation apparatus. These improvements would desirably further optimize energy requirements of such an apparatus for remediating soil of various aggregate sizes and conditions.

SUMMARY OF THE INVENTION

In accordance with the invention, a known drum drier and mixer type aggregate processing apparatus has been improved to provide an aggregate separator system as an integral part of the operation of the drum drier. Typically a drum drier is expected to dry and then mix distinct aggregate materials in a continuous process into a single product. The drum apparatus, as modified in accordance with the invention, permits constituent materials which differ in coarseness to be processed together, after which the materials are classified or separated as part of the process within the confines of the drum. The processed materials are thereafter discharged as distinctly classified aggregate materials or products, which may, as a specific example, consist of two distinct products, such as gravel and fines.

According to a particular aspect of the invention a drum apparatus comprises an elongate, generally cylindrical drum which includes first, second and third zones disposed lengthwise adjacent one another along a longitudinal axis through the drum. The drum of the apparatus is mounted to rotate about its longitudinal axis. The drum also includes known flight means disposed for advancing material within the confines of the drum in response to such rotation longitudinally in the direction toward the third zone. Burner means is provided to generate a stream of hot gases within at least the first zone of the drum, the gases flowing in a counterflow direction to the general direction of advance of aggregate materials through the drum. The third zone includes means for classifying and separating the aggregate materials according to size.

In a particular embodiment of the invention, advantageous features of the invention include screen implementations disposed longitudinally within the drum and a plurality of discharge provisions. The screen functions to separate the materials according to aggregate size as they progress longitudinally through the second zone of the drum and to direct the separated materials to a designated one of the discharge provisions.

Various other advantages and features of the invention will become apparent from the detailed description of the invention and a preferred embodiment thereof.

BRIEF DESCRIPTION OF THE DRAWINGS

The Detailed Description below may be best understood when read in reference to the accompanying drawings wherein.

DETAILED DESCRIPTION OF THE INVENTION

1. The Apparatus in General

Figure 1:
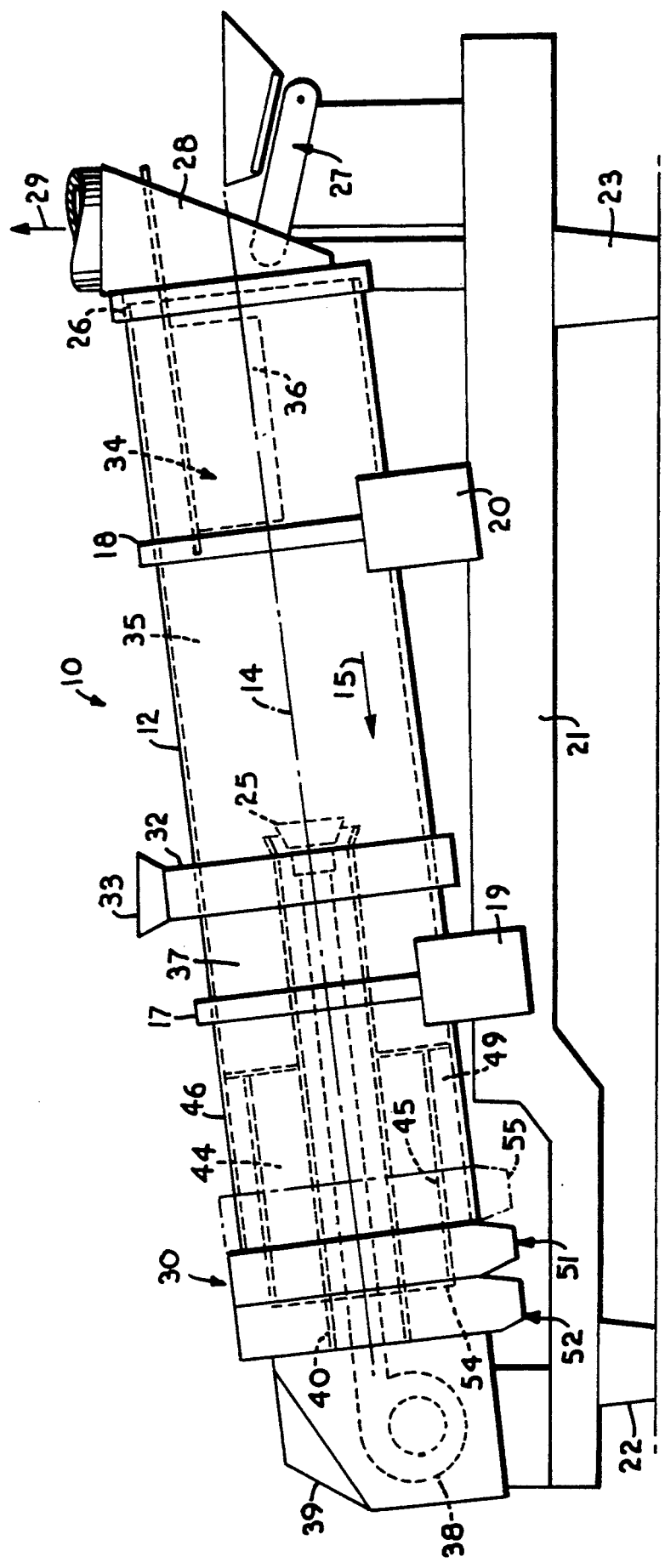
FIG. 1 is a simplified, somewhat schematic side elevation of a counterflow drum drier-mixer apparatus which is particularly adapted implement soil remediation and contains particular improvements in accordance with the present invention.

FIG. 1 is a simplified, somewhat schematic side elevation of a material processing plant or apparatus which is designated generally by the numeral 10. A material processing apparatus generally of a type illustrated in FIG. 1 might be referred to in the aggregate processing art as a counterflow drum drier-mixer apparatus. The apparatus 10 features a single, elongate, generally cylindrical drum 12. A longitudinal axis 14 of the drum 12 is disposed horizontally or, more precisely, generally horizontally because the drum is desirably set up at a small incline. According to known techniques, a small incline of the axis 14 with respect to the horizontal permits gravity to aid the flow of material through the drum 12 in a generally downstream direction as indicated by an arrow 15. Material movement through the drum is promoted by rotating the drum 12 about its longitudinal axis 14. The drum 12 is mounted to rotate on circumferential tires 17 and 18 which are nested and rest in corresponding wheel support assemblies which are schematically indicated at 19 and 20, respectively. The wheel support assemblies 19 and 20 are, in turn, mounted to and supported by a main frame 21. A drive provision for rotating the drum may be separate from the wheel support assemblies but may also be integral with the wheel support assemblies 19 and 20. For simplicity, the drum drive is shown to be part of the wheel support assemblies 19 and 20. When set up for operation, the main frame 21 typically is supported with respect to the ground by jacks or other supports 22 and 23.

The apparatus 10 is considered a counterflow drum drier-mixer because of a gaseous flow direction opposite to the general direction of flow of materials being processed within the drum 12. A burner unit 25 is disposed within the drum 12 which operates to direct hot combustion gases in an upstream, counterflow direction, opposite to the downstream direction of material movement through the drum 12. Thus when the apparatus 10 is operating, material would be introduced into an intake end or feed end 26 of the drum 12, as, for example, via a slinger type feed conveyor 27 or by other suitable feeder mechanisms. Hot combustion gases generated at the burner unit 25 advance from the burner unit toward the feed end 26 and exit through an exhaust chamber 28 from the apparatus 10, as indicated by an arrow 29.

The materials introduced by the feed conveyor 27 proceed, aided by gravity due to the incline of the drum 12, generally from the feed end 26 of the drum 12 toward a downstream or material discharge end which is designated generally by the numeral 30. In addition to the feed conveyor 27 for introducing materials at the upper or feed end 26 of the drum 12, the drum has a further, intermediate feed chute or port 32 for adding materials to the drum intermediate of its feed and discharge ends 26 and 30. The location of the intermediate port 32 along the axis 14 of the drum 12 is preferably at a position downstream of the burner unit 25. The intermediate port 32 may be of a typical well known structure, similar to the known structures of such intermediate ports for admitting recycle material into recycle material asphalt production plants, for example. The intermediate port 32 features a typical collar type feed chutes structure which is circumferentially disposed about the drum 12 and may encase typical peripherally disposed intake scoops (not shown) in the drum, for example, to receive and direct material to the interior of the drum 12. Top access is shown by a typical feed hopper structure 33 through which material may be introduced into the drum 12. The feed hopper structure 33 may have a typical funnel shape of a feed hopper or feed chute which guides introduced materials into the intake structure of the intermediate port 32. In further reference to materials, those materials introduced into the drum 12 at the feed end are referred to as first or prime materials, while materials introduced at the intermediate port 32 are referred to as second materials or secondary materials in distinction over the prime materials.

FIG. 1 also shows a known baffle plate assembly 34 which may be preferred to alter flow patterns of hot gases and the first materials in a first or heating zone 35 of the drum 12. The operation and function of the baffle plate assembly 34 is described in U.S. Pat. No. 5,067,254. In essence, by varying the angular orientation of one or two baffle plates 36, exposure of the first materials to the hot gas stream becomes increased or decreased. In this manner the energy transfer from the hot combustion gases to the first material may be controlled, thereby controlling the amount of energy having been absorbed by the materials when the materials leave the heating zone 35 of the drum 12. The feed conveyor 27 feeds the materials directly into the heating zone 35, the exhaust chamber 28 is formed for a feed-through of the first material to be received within the heating zone 35 of the drum 12. The intake end of the drum 12, hence upstream end of the heating zone 35 is open to the exhaust chamber 28 to facilitate the receipt of the first material within the heating zone 35.

A second zone immediately downstream and adjacent the first or heating zone 35 of the drum 12 constitutes and is referred to as a mixing zone 37. The mixing zone 37 is isolated from the stream of hot combustion gases that emanate from the burner unit 25 in that the combustion gases progress from the burner unit 25 toward the feed end 26 of the drum 12. In the mixing zone 37 the first and second materials become mixed. Intermingling or mixing action by the drum 12 brings the extremely hot first materials advancing from the flame region of the heating zone 35 into contact with the second materials, as they are introduced into the drum 12 through the intermediate port 32. The decontamination process with respect to the newly added second materials, consequently, takes place within the mixing zone 37 with heat energy supplied by the heated first materials to heat the second material introduced through the port 32. Heat transfer in the mixing zone 37 is believed to proceed primarily by conduction and only on a second order by radiation of energy from the superheated first materials and somewhat by radiation from the burner unit 25. The heat intake by the first materials should be carefully controlled to store in the first materials sufficient energy to heat the second materials to a temperature at which all contaminants within the second materials become volatilized and are removed. The heat output of the burner unit 25 directly upstream from the mixing zone 37 is consequently monitored and adjusted to respond to changes in material feed ratios between the first and second materials. The second material is heated and decontaminated while being mixed with the first material within the mixing zone 37. At the same time, the superheated and already fully decontaminated first material becomes already cooled prior to discharge. Main differences in the decontamination processes taking place in the heating and the mixing zones, respectively, are that the former decontaminates by exposing the material directly to the flame and hot gases, while the latter decontaminates by indirect heating. The burner unit 25 "pumps" the heat needed for the indirect heat decontamination process into the first materials, while the first materials then transfer their heat to the second materials.

The burner unit 25 is preferably a high output turbo burner which may be chosen to generate a flame with an energy output in a range of two hundred million BTU (British Thermal Units) per hour. A turbo compressor 38 is disposed in a compressor housing 39 adjacent the downstream discharge end 30 or lower end of the drum 12. The turbo compressor 38 is preferably mounted to the main frame 21. A central duct or air tube 40 leads from the compressor housing 39, preferably centered on the longitudinal axis 14, into the drum 12. The air tube 40 supports the burner unit 25 at its preferred position within the drum 12, communicates with the outside to provide secondary combustion air to the burner unit 25 and serves as a shield for primary air and fuel supply lines which are routed centrally through the tube 40 to the burner unit 25.

Downstream of the mixing zone 37, and adjacent thereto, lies a third zone, a material separation or material classification zone 44 of the drum 12. The material classification zone 44 is characterized as shown in the embodiment of FIG. 1 by preferably a cylindrical screen structure 45. The screen structure 45 would in general be of cylindrical shape and be disposed coaxially with the longitudinal axis of the drum 12. In FIG. 1, the screen structure is disposed concentrically with, and within, an outer cylindrical solid wall 46 of the drum 12. Rotating action of the drum 12 raises the materials to seemingly move "up" the step during the advance of the materials in a general downstream direction toward the discharge end 30. An annular end plate 47 lying within a cross-sectional plane of the drum 12 caps off an annular space between the wall 46 of the drum and the screen 45. The annular end plate 47 also locates the upstream end of the screen structure 45 in a coaxial, hence, a concentric disposition with respect to and within the drum 12. The screen mesh size may be chosen, for example to admit fines and stones of less than 1 inch in size, for example. The admitted materials then make up a first product. After first product of fines has been separated from the bulk of materials by the mesh size of the screen structure 45, it advances within an annular space 49 between the screen 45 and the drum wall 46.

At the discharge end 30 of the drum there are shown two adjacent, first and second, discharge hoppers or hopper-and-chute combinations which are designated by the numerals 51 and 52, respectively. The screened out first product or fines material moves downstream within the annular space 49, driven by the rotation of the drum 12, and is directed to the first discharge hopper and chute 51, while the material which is more coarse and therefore unable to have passed through the selected mesh of the screen structure 45 advances toward the very end 54 of the drum 12 and is discharged into the second discharge structure 52, the chute and hopper 52. The classification zone 44 of the drum 12 consequently separates from each of the first and second materials the fines and small stones and classifies the mixed materials into first and second products which are discharged thereafter through the first and second chutes 51 and 52, respectively. As may be realized from the foregoing, it is contemplated within the scope of the invention to provide more than just the single screen structure 49 and to, alternatively, discharge three or more separate products, as is schematically indicated in FIG. 1 by a third discharge hopper and chute 55. The third hopper and chute combination 55 is depicted as an alternative, shown in phantom lines to indicate a possible location of the chute 55 with respect to the drum 12.

2. Operation of the Apparatus

Figure 2:
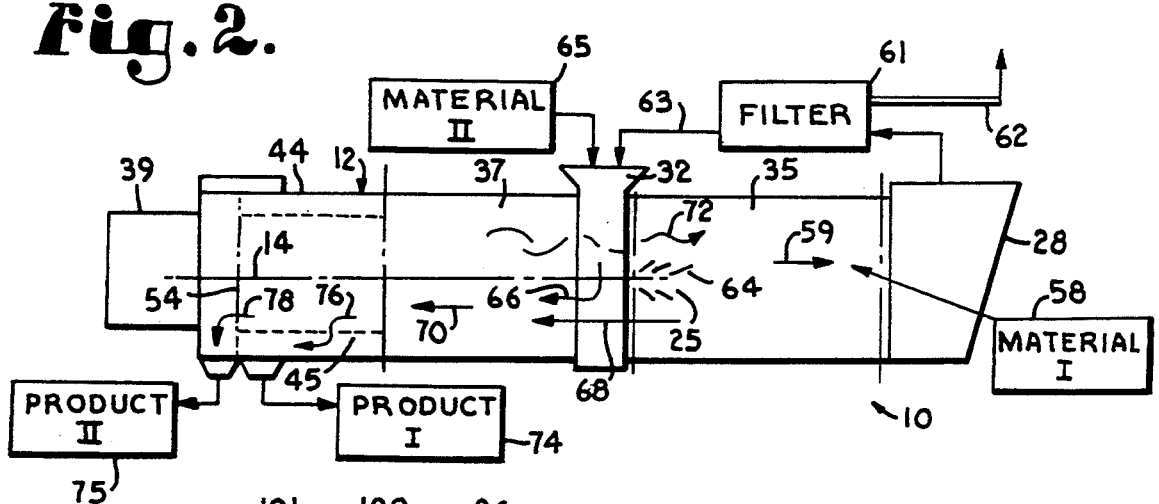
FIG. 2 is a fully schematic representation of the drum drier-mixer apparatus, illustrating particular process sequences of the present invention.

FIG. 2 shows a schematically simplified representation of the apparatus 10 to best illustrate various phases of soil remediation or decontamination according to the invention. A substantial and advantageous use of the apparatus 10 may be realized seen by the fact that its soil remediation is based on a single drum apparatus. Hard to remove contaminants are subjected to the decontamination within the first or heating zone 35. Energy is supplied to the burner unit 25 to remove all contaminants. It is further desirable to accomplish such removal with a minimum of excess energy usage. Second materials are added to the intermediate port to use up any excess energy to reduce the temperature of the superheated first materials and to decontaminate the second materials. It is then further to then classify the remediated soil by separating gravel or stones from the bulk of the soil. Such removal may be particularly desirable when soil is being remediated to which gravel had been added prior to the soil becoming contaminated, such as by gasoline or oil spillage or leaks from storage tanks.

FIG. 2 shows a first material 58 which is taken from a supply of the first material 58 ("MATERIAL I") and is transferred or fed into the feed end 26 of the drum 12 and enters the heating zone 35. Continued downstream movement of the material 58 through the drum 12 is effected by rotation of the drum 12 about its longitudinal axis 14. Hot gases flow through the heating zone 35 in a direction opposite to that of the general flow of the first material 58, a hot gas stream being shown by the arrow 59. The stream 59 of hot gases dries and heats the first material 58. The first material 58 may contain a significant amount of fines as well as stones ranging from insignificant sizes to an about one inch size or even larger. In a described soil remediation or decontamination process, the materials are to be heated to a temperature at which contaminants, such as hydrocarbons absorbed into and contained within the soil, become volatilized and are removed from the soil. Soils samples may be tested prior to treatment to determine a minimum temperature and a minimum time beyond which soil contaminants have substantially vaporized and have left the soil. Such preliminary testing may provide needed information which permits the bulk of like soils to be remediated at a minimum energy cost. Only required amounts of combustion gases are exhausted into the atmosphere.

The stream 59 of hot combustion gases is exhausted from the drum 12 via the exhaust chamber 28. A strong gaseous movement emanating from the burner unit 25 not only vaporizes hydrocarbons from the first material 58 or first soil introduced into the drum 12, but also carries off much of the fine soil particles of the first material 58, soon after the first material 58 enters the heating zone 35. The stream 59 carrying the fines or dust particles is routed to a dust separator which may be a known centrifugal or cyclone separator or a combination of such a cyclone separator and a well known bag house filter, any combination of such filters being indicated generally by the filter function 61 ("FILTER"). From the filter 61 the cleaned gases are exhausted to the atmosphere as indicated by an arrow 62. Fines 63 which have been filtered out may be returned to the process to be mixed with the remainder of the first material 58 after such remainder has been heated to a first temperature at which hydrocarbon contaminants have become vaporized and have been burned within a plume of luminous gases which constitute a flame 64 emanating from the burner unit 25. The filtered out fines 63 are preferably returned to the heated first material via the intermediate port 32. The process of decontaminating soil in a stream of hot gases, filtering fines of the soil from the stream and returning the filtered fines to the remaining soil to recombine them with the soil has been described in detail in a copending application, Ser. No. 07/908,903 filed Jul. 2, 1992 by Joseph E. Musil, which is a continuation of application Ser. No. 07/638,046 filed Jan. 7, 1991, now abandoned, the invention of the prior applications being assigned to the assignee of this application. The referenced copending application discloses particularly that recombined dust particles or fines experience a reheating by heat transfer from the heated base material within the apparatus. The reheating tends to vaporize contaminating hydrocarbons which may still be associated with the fines when the fines are carried off in a strong gas flow immediately on being fed into the apparatus. The recombination of the fines with the rest of the soil occurs in a region of the decontamination apparatus which is substantially devoid of gas flow. The substantial absence of gas flow allows the fines to be recombined with the soil rather than being carried off again by strong gaseous currents.

Second materials 65 are those that may contain contaminants which are relatively more volatile than those in the material 58. Also, the second materials 65 would be generally less coarse materials than the material 58. Consequently, the second material 65 is more readily heated to the volatilization temperature of the included hydrocarbons than the first material 58. The second material 65 is taken from a supply of such second material 65 ("MATERIAL II") and is introduced into the drum 12, together with any returned fines 63, through the intermediate port 32. The generally smaller particle size of the second material 65, and the inclusion of the returned fines causes the point of introduction of the second material 65 to be desirably downstream, hence away from, the hot gas stream 59. The second material 65 enters the mixing zone 37 to advance further through the drum 12 in the direction shown schematically by arrow 66. The heated first material 58 flows generally through the drum 12 as shown schematically by arrow 68. The mixing zone includes those flights which are typically known as conducive to furthering the materials to mix, as shown by flights 67 shown schematically in FIG. 3. Referring back to FIG. 2, in the mixing zone 37 the first material 58, any returned fines 63, and the second material 65 become thoroughly mixed into a single material as indicated schematically by the arrow 70. Heat is transferred from the heated first material 58 to the second material 65 to volatilize any hydrocarbons in the second material 65. Vaporized hydrocarbons and any water vapor is shown schematically by dashed wavy arrow 72. It is to be noted that there is essentially no gaseous movement within the mixing zone 37, except the escape of the vapors generated by the heat transfer from the first material 58 to the second material 65. Toward the downstream end of the mixing zone 37 the heated first material 58 is sufficiently cooled to be discharged from the drum.

At the downstream end of the mixing zone 37, the mixed materials enter the third or material separation zone 44 of the drum 12. FIG. 2 schematically shows as an example the separation or classification of the mixed materials into first and second products 74 and 75, respectively. The first product 74 ("PRODUCT I") constitutes the finer, screened product. The first product 74 is the "screened product" that has been admitted through the screen structure 45 and has been separated from larger sized, remaining material, as shown by arrow 76. The second product 75 is consequently comprised of primarily coarse materials, namely those that did not pass through a selected mesh size of the screen structure 45. The second product 75 is shown to advance to the end 54 of the drum 12, to be discharged from the drum as shown by arrow 78.

As a modification of the described process, portions of the first product 74 may be allowed to cool and may be introduced into the intermediate port 32 together with filtered fines 63 when no other second material with relatively volatile hydrocarbons is available. In such latter modification, the main purpose of the reintroduction of the cooled first product 74 is to cool the first material 58 when it becomes mixed with the product 74 in the mixing zone 34.

Figure 3:
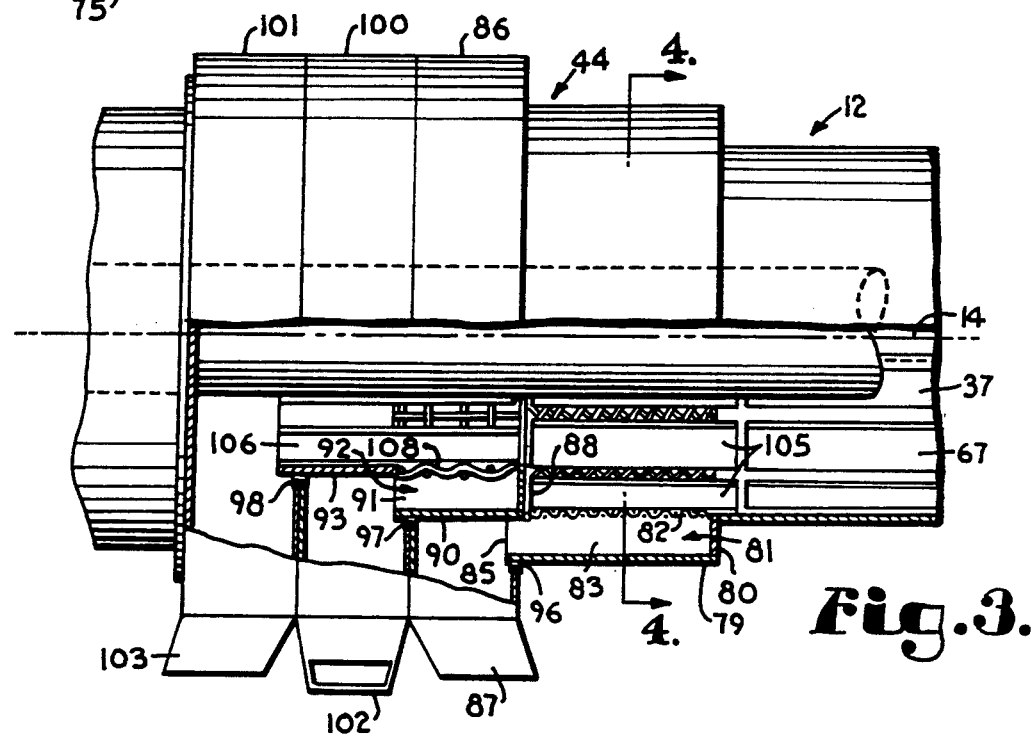
FIG. 3 is a partial side elevation of an alternate embodiment of the drum drier-mixer apparatus shown in FIG. 1, showing contemplated variations of the improvements according to the present invention.

FIG. 3 shows an alternate embodiment of the drum 12, and particularly shows a modification of the material separation or classification zone 44 to provide for the discharge of three separately classified products. At the upstream end of the materials separation zone 44, the diameter of the drum 12 may be enlarged, for example. Diametrical enlargements of drier drums are generally known to provide additional drum volume when needed. A diametrically enlarged wall 79 of the drum 12 is mounted to the drum by an annular end plate 80 which in end view defines an annular space 81. Along the radially inward boundary of the space 81 a continuation of the cylindrical wall of the drum 12 is a screen 82. Fines, such as the returned fines 63 discussed in reference to FIG. 2, may, for example, be separated through such upstream or first screen 82. A plurality of auger plates 83 are disposed circumferentially, and preferably uniformly, spaced, on the inside of the drum 12 within the space 81. The auger plates extend in one dimension radially inward from the inside of the drum 12. In an orthogonal direction to the radial dimension the auger plates are preferably helically skewed with respect to the length of the drum 12.

The auger plates 83 serve both material processing and structural functions. First, the helical skew of the auger plates 83 about the central axis 14 of the drum 12 causes the screened-out material to be advanced toward the downstream end 85 of the annular space 81 to be dumped into a first annular discharge hopper 86 to be discharged through a corresponding chute 87. A second purpose of the auger plates 83 is to provide support for the screen 82 in that the screen panels 82 rest on the auger plates. The auger plates 83 also support any further downstream separation stage. An annular end plate 88 may be mounted concentrically with the central axis of the drum 12 next to the downstream end 85 of the space 81. The radially inner ends of the auger plates 83 support the annular end plate 88, and further support a solid, cylindrical continuation wall 90 of the wall of the drum 12. It should be realized, however, that the cylindrical continuation wall 90 need not be coextensive of the wall of the drum 12, but may be of a diameter other than the diameter of the drum 12 in general. Auger plates 91 extend within an annular space 92 generated by the annular end plate 88 and the wall 90. The auger plates 91, in turn, support and concentrically space a further cylindrical drum wall section 93. Concentricity of each of the cylindrical wall sections 79, 90 and 93 with respect to the drum 12 itself is somewhat critical. Close, yet rotationally non-interfering fits form part of the structural characteristics between the outer surfaces of the wall sections 79, 90 and 93 with respect to circular openings 96, 97 and 98 in respective discharge hoppers 86, 100 and 101. The hoppers 100 and 101 have respective lower discharge chutes 102 and 103. The concentricity of the drum wall sections is enhanced by flights 105, 106 which bridge corresponding annular spaces 81 and 92.

Figure 4:
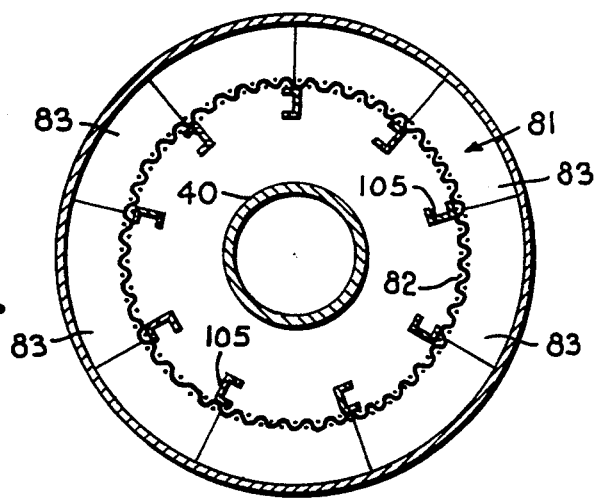
FIG. 4 is a cross-sectional view through the drum shown in FIG. 3, showing particular material advancing means which may be employed in realizing advantageous features of the present invention.

FIG. 4 is a somewhat simplified cross section through the drum 12 at the annular space of the diametrically enlarged section of the drum. The auger plates 83 are shown as being disposed helically skewed about the air tube 40 extending centrally through the drum 12. The flights 105 may be attached at one end to an inner surface of the drum 12, at the other end to the annular end plate 88. The flights 105 may conveniently be used as hold-down stringers for retaining sections of the screen 82. In the described embodiment, as shown in FIG. 4, the cylindrical form of the screen 82 or various sections thereof which make up the cylindrical screen become clamped between the flights 105 and the underlying auger plates 83. Referring back to FIG. 3, the flights 106 may also become attached to the annular plate 88, and at their respective other ends, the flights 106 are conveniently mounted to an inner surface of the cylindrical wall 93. In the described structure, the flights 106 would also serve to hold down screen 108 which bridges the annular space 92.

The screen 108 is of a larger mesh size than the screen 82 and admits primarily gravel sized material which was larger than the smallest size admitted through the screen 82. The admitted material is advanced by the auger plates 91 and is discharged into the discharge hopper 100. Material which is not classified by either the screen 82 or the screen 108 is advanced by the flights 106 to the discharge hopper 101 and its respective chute 103. The structure including the screens 82 and 108 is therefore capable of separating two product sizes from the bulk of the mixed product passing through the mixing zone 37, the remainder being a third product which will be discharged through the chute 103. First, second and third products may therefore be discharged through the chutes 87, 102 and 103, respectively. The discharge chutes 87, 102 and 103 may be directed to alternately opposite sides of the drum 12, as shown in FIG. 3. Though a three-product discharge alternative has been disclosed as a likely alternate structure to the two-product apparatus and method described with respect to FIGS. 1 and 2, mere two products may be preferred in many remediation uses. The more coarse product serves well as a subsoil material, possibly mixed with a portion of the first or finer product. The alternate embodiment shown in FIG. 3, may, however, be modified to become a two product apparatus by either removing the screen 108 entirely or by replacing the screen 108 with solid plate in the cylindrical configuration of the screen 108. With the screen 108 removed, the chutes 87 and 102 would discharge the first and second products 74 and 75. When the screen 108 is replaced with solid plate, the chutes 87 and 103 discharge the first and second products 74 and 75, instead.

Various other changes and modifications in the structure of the described embodiments are possible without departing from the spirit and scope of the invention as defined by the claims.

What is claimed is:

1. A soil decontamination apparatus comprising:
   a drum disposed generally horizontally and supported to rotate about a central axis therethrough, the drum having a material intake end and a material discharge end and including means for advancing materials in a downstream direction of the drum from the intake end toward the discharge end;
   a heating zone disposed within the drum adjacent the feed end, the apparatus including means for generating a hot stream of gases to flow through the heating zone toward the material intake end;
   means disposed at the intake end of the drum for receiving materials fed into the heating zone of the drum;
   a mixing zone disposed adjacent and downstream of the heating zone, the mixing zone including means for receiving a second material and means for mixing the first and second materials; and a classification zone disposed adjacent a downstream end of the mixing zone and extending to the discharge end of the drum, the classification zone including means for separating materials according to size into at least first and second products and at least first and second discharge means for discharging, respectively, the first and second products at the discharge end of the drum.

2. The apparatus according to claim 1, wherein the means for receiving a second material comprises a collar type feed chute disposed longitudinally of the drum intermediate the material intake end and the discharge end for feeding the second material into the drum, the feed chute being disposed downstream of a stream of hot gases within the heating zone.

3. The apparatus according to claim 1, wherein the means for separating materials according to size comprises at least one screen section disposed circumferentially adjacent the drum and the first and second means for respectively discharging the first and second products comprise first and second discharge chutes.

4. The apparatus according to claim according to claim 3, wherein the means for receiving a second material comprises an intermediate feed hopper and chute, the apparatus further comprising means for routing the hot stream of gases from the heating zone to a filter means, a filter means for filtering the hot stream of gases to remove fines of the first material carried by the hot stream of gases from the heating zone of the apparatus, means for routing the hot stream of gases from the heating zone to the filter means, and means for feeding the filtered out fines from the filter means into the intermediate feed hopper and chute.

5. The apparatus according to claim 4, wherein the means for separating materials according to size comprises first and second screen sections disposed circumferentially adjacent the drum and axially adjacent each other, the first screen section of a finer mesh relative to the second screen section disposed upstream of the second screen section, the apparatus comprising a third discharge chute for discharging the first, the second and a third material.

6. A soil decontamination apparatus comprising:
an elongate drum supported substantially horizontally to rotate about a longitudinal axis therethrough, the drum having an upstream material intake end and a downstream material discharge end and a downstream material flow direction through the drum from the material intake end toward the material discharge end, a material heating zone disposed adjacent the material intake end, a material mixing zone disposed downstream of the material heating zone, and a material separation zone disposed downstream of the material mixing zone;
means for feeding a first material at the material intake end into the heating zone of the drum;
burner means for generating a stream of hot gases at the downstream end of the heating zone to flow in an upstream direction toward the material intake end and for exhausting the stream of hot gases from the material intake end of the drum;
means for rotating the drum and for moving material within the drum generally in the downstream direction toward the material discharge end of the drum;
means disposed downstream of the burner means for introducing a second material into the mixing zone of the drum;
means for mixing the first material and the second material in the material mixing zone; and
means disposed in the material separation zone for classifying and separating the mixed material according to size into at least first and second products.

7. The apparatus according to claim 6 comprising at least one screen disposed concentric with and interiorly spaced within the drum, and a plurality of auger plates angularly skewed with respect to the axis of the drum and disposed within the drum between the drum and the screen to support the screen, the screen having openings for receiving the first product therethrough.

8. The apparatus according to claim 7, comprising at least first and second discharge chutes disposed at the discharge end of the drum for discharging the at least first and second products.

9. The apparatus according to claim 8, wherein the at least one screen comprises first and second screen sections disposed axially adjacent one another, the first screen section having a first size mesh, the second screen section having a second size mesh larger than that of the first screen section for separating and classifying three separately sized products.

10. A method of decontaminating soil comprising:
feeding a first material to be decontaminated into an upstream end of an elongated drum and moving the material in a general direction toward an opposite downstream end of the drum;
heating the first material in a heating zone adjacent the upstream end of the drum in a stream of hot gases to vaporize contaminants within the first material;
advancing the material out of the heating zone within the drum out of the stream of hot gases and into an adjacent mixing zone within the drum;
adding a second material within the mixing zone to the first material and mixing the first and second materials, thereby heating the second material with heat transferred from the first material to vaporize contaminants from the second material;
advancing the mixed first and second materials to a separation zone within the drum and separating the mixed materials into at least two products classified according to size; and
discharging the at least two classified products as separate products at the downstream end of the drum.

11. The method according to claim 10, wherein the step of advancing the mixed first and second materials comprises rotating the drum and lifting the materials with flights internally disposed within the drum to move the materials toward a screen circumferentially spaced interiorly of the drum and screening a portion of the material through the screen toward a first discharge chute as a first material while advancing remaining material downstream to a second discharge chute as a second material.

12. The method according to claim 10, further comprising exhausting the stream of hot gases at the upstream end of the drum, filtering fine dust particles from the exhausted stream of hot gases, and returning the filtered-out fine dust particles as at least part of the second product to the mixing zone of the drum to be mixed with the material passing through the mixing zone and to be heated thereby.

13. The method according to claim 12, wherein the step of advancing the mixed first and second materials to a separation zone includes separating the mixed materials into three products, and the step of discharging comprises discharging the three products through three separate discharge chutes at the downstream end of the drum.

14. The method according to claim 10, further comprising a first of the two discharged products and returning at least a portion of the first cooled product to the mixing zone as the second material to be mixed with the materials passing through the mixing zone.

* * * * *